(12) United States Patent
Kretchmar

(10) Patent No.: US 7,416,657 B2
(45) Date of Patent: Aug. 26, 2008

(54) OIL WATER COALESCING SEPARATOR

(75) Inventor: Robert J. Kretchmar, Waltham, MA (US)

(73) Assignee: NexJen Technologies Ltd., Waltham, MA (US)

( * ) Notice: Subject to any disclaimer, the term of this patent is extended or adjusted under 35 U.S.C. 154(b) by 88 days.

(21) Appl. No.: 11/385,554

(22) Filed: Mar. 21, 2006

(65) Prior Publication Data

US 2007/0221553 A1    Sep. 27, 2007

(51) Int. Cl.
   *B01D 17/02*    (2006.01)
(52) U.S. Cl. .................. 210/95; 210/95; 210/241; 210/521; 210/DIG. 5; 220/483
(58) Field of Classification Search ............ 220/480, 220/481, 483; 210/95, 241, 521, DIG. 5; 248/206.5, 309.4, 311.2, 683, 672
   See application file for complete search history.

(56) References Cited

U.S. PATENT DOCUMENTS

| | | | |
|---|---|---|---|
| 911,314 A | 2/1909 | Maranville | |
| 3,094,486 A | 6/1963 | Goeltz | |
| 3,198,467 A * | 8/1965 | Elfsten | 248/206.5 |
| 3,836,000 A | 9/1974 | Jakubek | |
| 3,894,949 A | 7/1975 | Enzmann | |
| 3,957,641 A * | 5/1976 | Jakubek et al. | 210/120 |
| 4,072,614 A | 2/1978 | Harris | |
| 4,123,365 A | 10/1978 | Middelbeek | |
| 4,139,463 A | 2/1979 | Murphy et al. | |
| 4,149,973 A | 4/1979 | Harris | |
| 4,199,451 A | 4/1980 | Hsiung et al. | |
| 4,333,835 A | 6/1982 | Lynch | |
| 4,422,931 A | 12/1983 | Wolde-Michael | |
| 4,722,800 A | 2/1988 | Aymong | |
| 4,869,831 A * | 9/1989 | Hinkle, II | 210/744 |
| 4,990,246 A | 2/1991 | Blazejczak et al. | |
| 4,994,186 A | 2/1991 | Hays | |
| 5,296,150 A | 3/1994 | Taylor, Jr. | |
| 5,344,255 A * | 9/1994 | Toor | 405/128.75 |
| 5,458,817 A | 10/1995 | Lang | |
| 5,520,825 A | 5/1996 | Rice | |
| 5,549,823 A | 8/1996 | Hirs | |
| 5,554,301 A | 9/1996 | Rippetoe et al. | |
| 5,578,203 A | 11/1996 | Ford et al. | |
| 5,601,705 A * | 2/1997 | Glasgow | 210/104 |
| 5,637,234 A | 6/1997 | McCasland | |
| 5,714,069 A | 2/1998 | Sager | |
| 5,730,872 A | 3/1998 | Rhodes | |
| 5,795,478 A | 8/1998 | Hirs | |
| 5,928,524 A | 7/1999 | Casola | |
| 5,971,163 A | 10/1999 | Gurfinkel | |
| 5,993,676 A | 11/1999 | Lowery, Jr. | |
| 6,041,717 A * | 3/2000 | Kubat | 108/44 |
| 6,200,490 B1 | 3/2001 | Hirs | |
| 6,641,738 B2 | 11/2003 | Hard | |
| 6,907,997 B2 | 6/2005 | Thacker et al. | |
| 2002/0157996 A1 | 10/2002 | Glasgow | |

(Continued)

*Primary Examiner*—Terry K Cecil
(74) *Attorney, Agent, or Firm*—Pearne & Gordon LLP

(57) ABSTRACT

An oil water coalescing separator has a coalescing chamber containing oil coalescing media. The separator is preferably substantially transparent so that the thickness of the band of coalesced tramp oil can be visually discerned at a glance. The separator preferably has a magnet base so the separator can be hung on a machine off the floor. The separator is also removable from the magnet base.

15 Claims, 6 Drawing Sheets

U.S. PATENT DOCUMENTS

| | | | |
|---|---|---|---|
| 2004/0078933 A1* | 4/2004 | Forrest | 16/417 |
| 2005/0035037 A1 | 2/2005 | Lindsey et al. | |
| 2005/0126988 A1 | 6/2005 | Thacker et al. | |
| 2005/0126989 A1 | 6/2005 | Thacker et al. | |
| 2005/0173337 A1 | 8/2005 | Costinel | |

* cited by examiner

OIL WATER COALESCING SEPARATOR

The present invention relates to a separator for separating oil from oily water, such as contaminated metalworking fluid or coolant or cleaner fluid.

DESCRIPTION OF RELATED ART

Computer controlled and manual controlled machines are commonly used for cutting metal. Metalworking fluid or coolant is delivered to the point of cutting to provide lubricity, cooling and removal of metal chips being generated by the machining process. The coolant is predominately water but gradually gets contaminated with oily materials such as hydraulic fluids, lubricants and greases. The coolant must periodically be rejuvenated by removing the tramp oil that collects in the water-based coolant or metalworking fluid. Oil-contaminated water is also produced in industrial manufacturing plants by manufacturing processes such as molding operations, metalworking, heat-treating, pretreatment, lubricating applications, machining operations, food processing, etc. Oil-contaminated water is also produced or found in wastewater, refineries, offshore production facilities, parking lots, garages, service facilities, and outdoor waters (such as oil spills), ponds, lakes, basins, waterways etc. The contents of U.S. Pat. Nos. 6,641,738 and 5,458,817 are incorporated herein by reference. An improved oil water coalescing separator is needed to separate the oil from the oil-contaminated water.

SUMMARY OF THE INVENTION

An apparatus for separating oil from an oil water mixture is provided. The apparatus comprises an oil water coalescing separator having a coalescing chamber having a sidewall. The coalescing chamber contains oil coalescing media. The separator has during operation a band of collected tramp oil having a thickness and floating on top of an aqueous fluid. The band has a bottom surface and at least a portion of the sidewall is sufficiently transparent or translucent so that the location of said bottom surface can be visually discerned through said portion by an unaided eye of an ordinary observer standing 8 feet away in ordinary lighting conditions.

DETAILED DESCRIPTION OF THE PREFERRED EMBODIMENTS OF THE INVENTION

In the description that follows, when a preferred range, such as 5 to 25 (or 5-25), is given, this means preferably at least 5 and, separately and independently, preferably not more than 25. In the Figures, the panels and internal walls and tubes of the separator are generally shown as opaque so the assembly can be more easily understood, but preferably they are transparent or translucent. As used herein, transparent means letting light pass through so that objects on the other side can be clearly distinguished; translucent means letting light pass through but diffusing it so that objects on the other side cannot be clearly distinguished. As used herein, an ordinary observer is an ordinary worker in a plant or factory which would typically use an oil water coalescing separator such as described herein; an unaided eye is one that has normal 20/20 vision without additional assistance such as additional lenses, magnification lenses, filters, binoculars, telescopes, etc; ordinary lighting conditions means the ordinary lighting conditions which typically prevail during normal working hours at locations where an oil water coalescing separator such as described herein would typically be used. As used herein, tramp oil includes oil or oily material which is removed or separated from aqueous fluids contaminated with oil or oily material.

Figure 1:
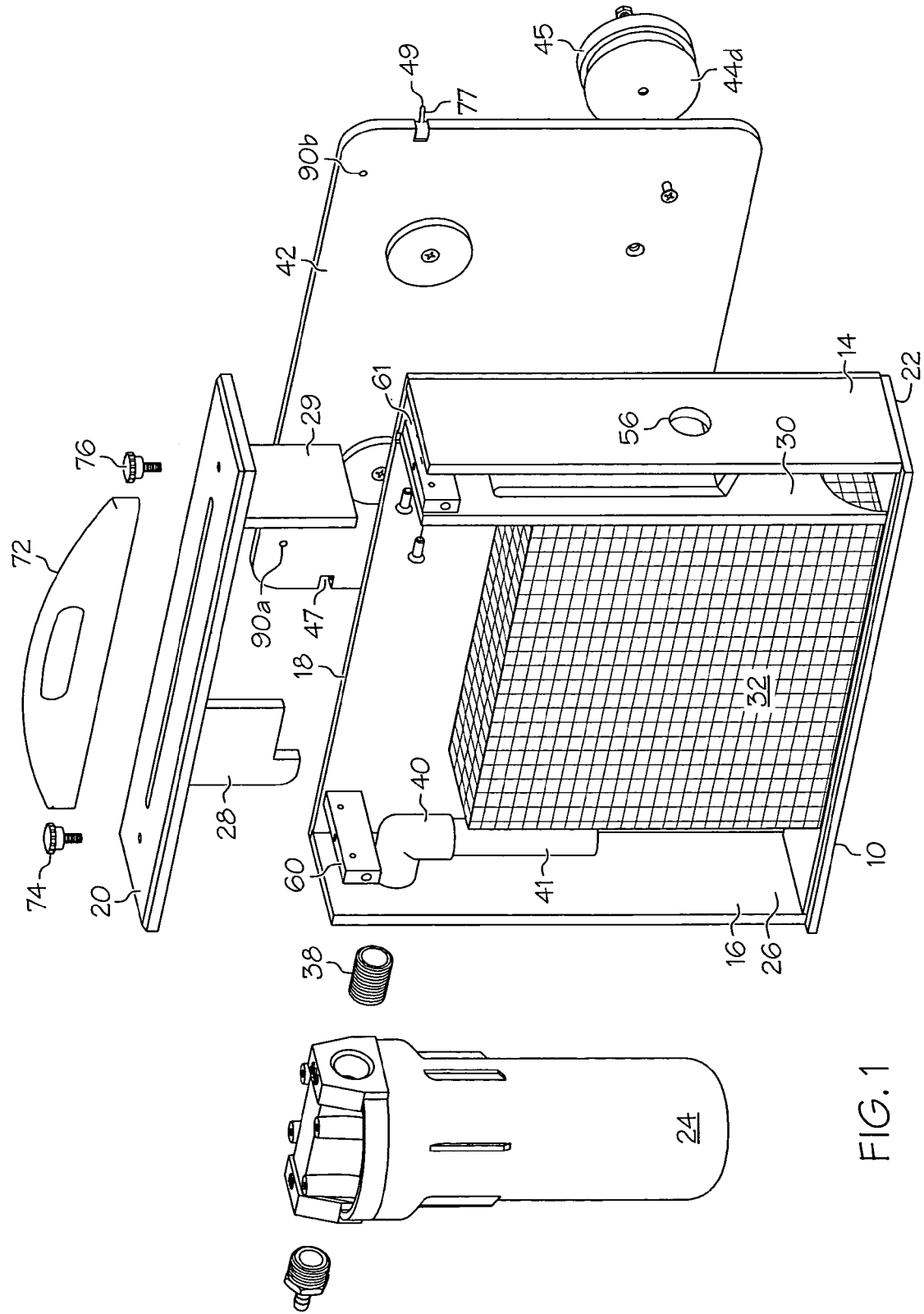
FIG. 1 is an exploded view of an oil water coalescing separator according to the invention.
Figure 2:
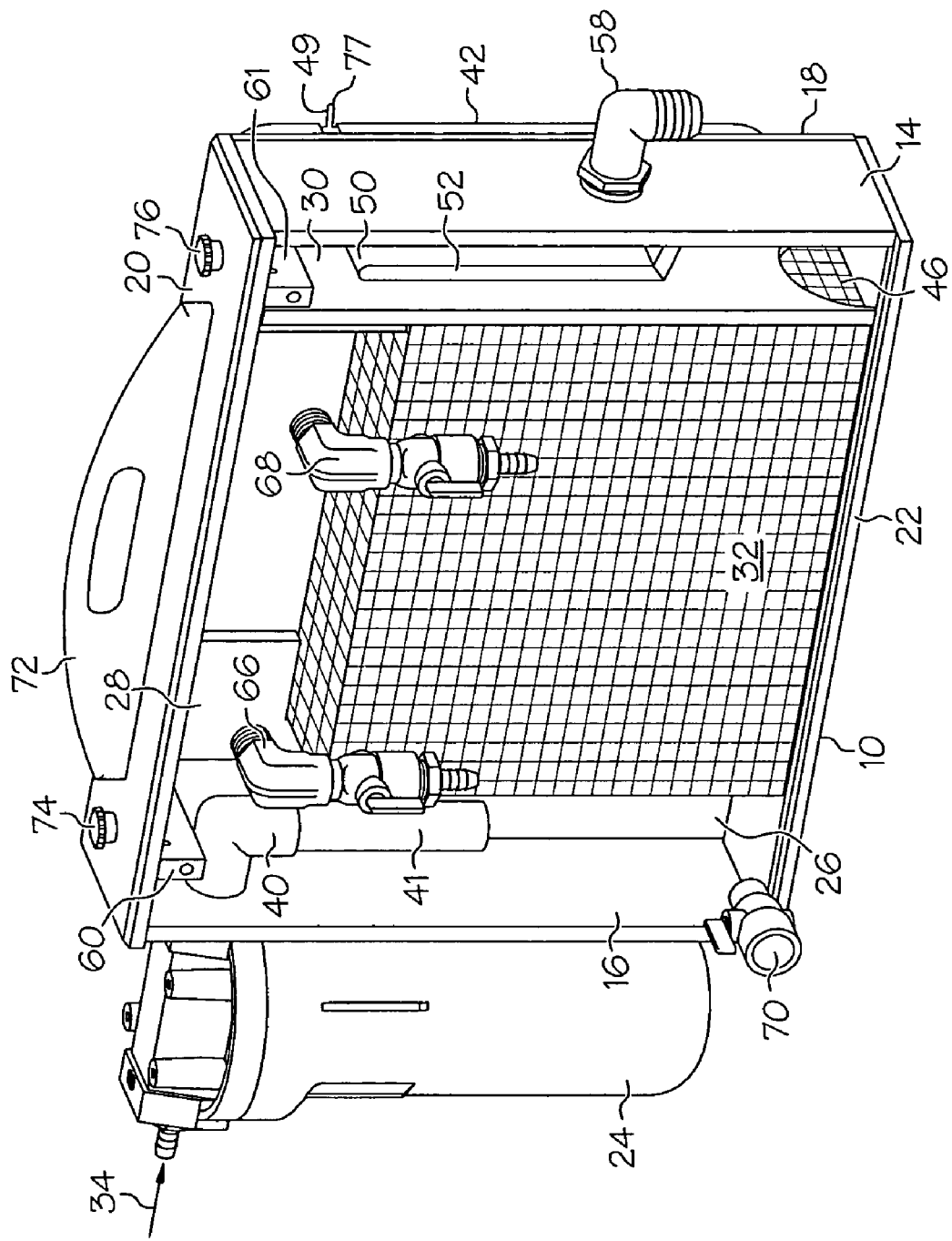
FIG. 2 is a front-right-top perspective view of the separator of FIG. 1 with the front panel 12 removed to more clearly show the interior.
Figure 4:
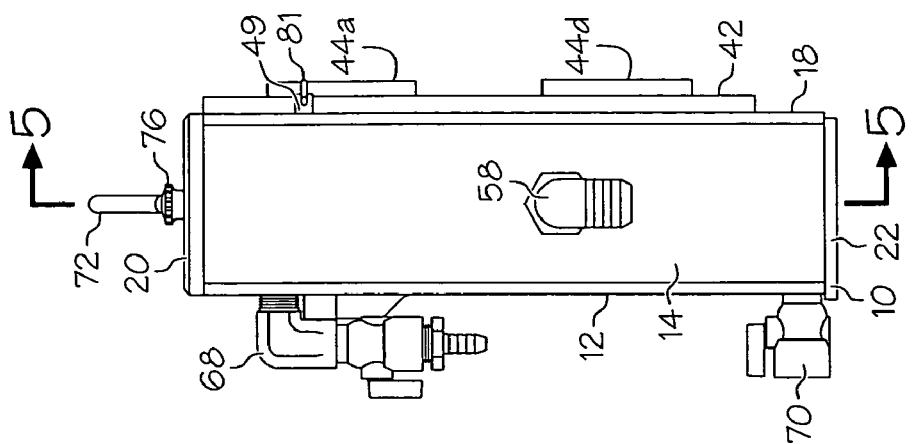
FIG. 4 is a right side elevational view of the separator of FIG. 3.
Figure 5:
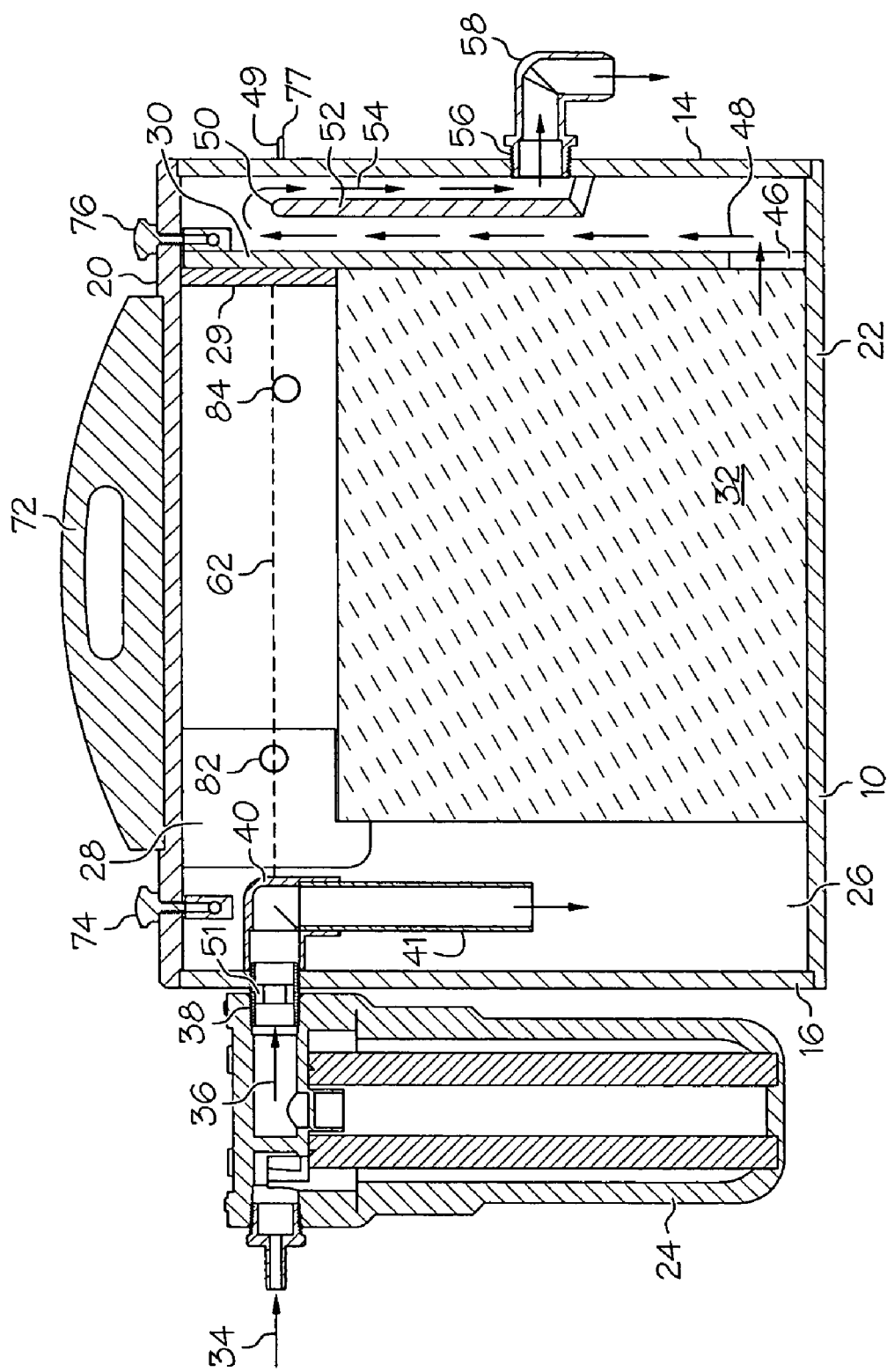
FIG. 5 is a cross-sectional view taken along line 5-5 of FIG. 4.
Figure 6:
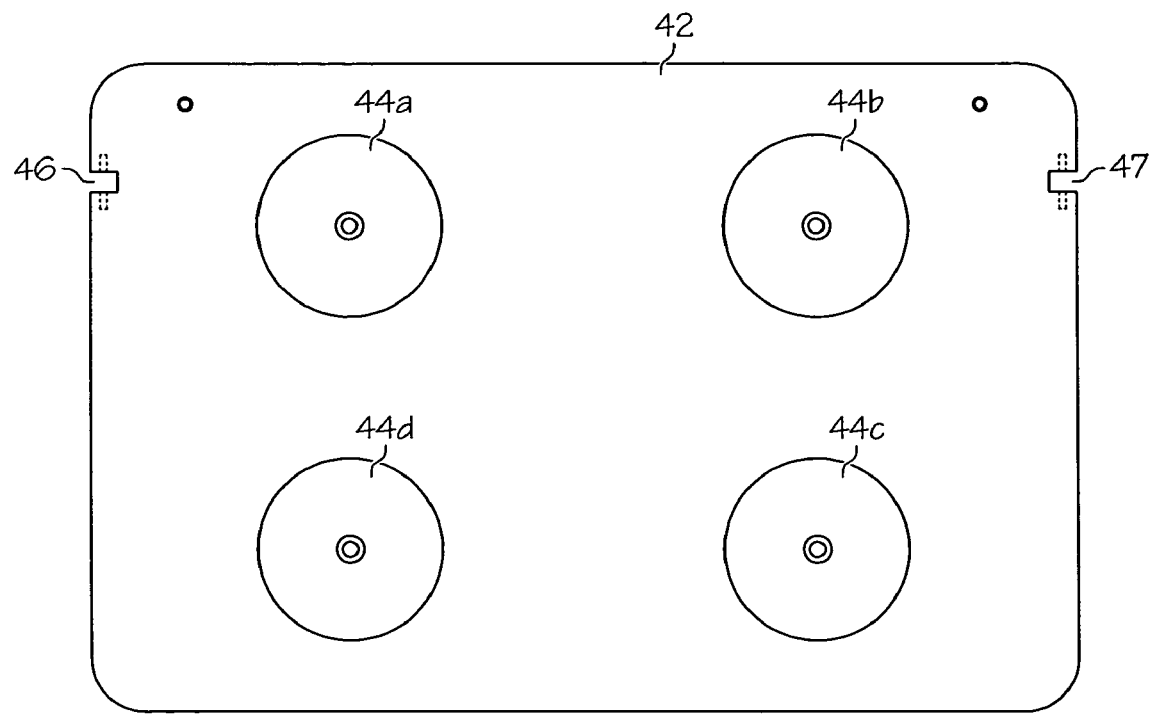
FIG. 6 is an exterior elevational view of the magnet base of the separator of FIG. 2.

FIGS. 1-3 and 5 show an apparatus for separating oil from an oil water mixture; the apparatus includes an oil water coalescing separator 10 and a prefilter 24. With reference to FIGS. 1-6, there is shown an oil water coalescing separator 10 having a front or front panel or front wall 12, a right side or right side panel 14, a left side or left side panel 16, a back or back panel 18, a top 20 and a bottom 22. Preferably a prefilter 24, such as a 10-inch commercial clear housing filter from Flowmatic (75 microns preferred), is attached as shown to the separator 10. Separator 10 has a coalescing chamber 26 between left side panel 16 and right chamber wall 30. The coalescing chamber 26 contains oil coalescing media, preferably porous packing 32 made of polypropylene, such as Product HD Q-PAC (this product is porous packing) from Lantec Products, Inc. (www.lantecp.com and telephone number 781-769-1901) or as described in U.S. Pat. No. 5,458,817. Porouspacking 32, such as Product HD Q-PAC, preferably has a specific surface area of at least 30, 50, 60, 70, 80, 90, 100, 120, 130 or 132, $ft^2$ per $ft^3$, a void fraction of at least 50, 60, 70, 80, 85 or 87, percent, and smallest gap of less than 6×6 or 5×5 mm, or about 4×4 mm. Less preferably, the oil coalescing media can be 5/8" diameter or other size polypropylene balls from Hoover Precision Products, or other oil coalescing media as known in the art, preferably polypropylene. Porous packing 32 can be held in place by retainer 28 and hold down plate 29. If the oil coalescing media is polypropylene balls, they can be held in place by a horizontal perforated plate located where the top surface of packing 32 is shown in FIGS. 2 and 5.

The separator 10 operates as follows. The oil water mixture to be separated enters the prefilter 24 as shown at arrow 34. The prefilter 24 removes solids in the fluid. The mixture travels via path 36 through tube or channel 38 into the separator 10 and then descends via elbow 40 and tube or passageway 41 into the coalescing chamber 26. Once the oily water enters the coalescing chamber 26, it flows left to right through the porous packing 32, contacting and coalescing on the surfaces of the oil coalescing media, then exiting the coalescing chamber 26 through opening 46 provided in the bottom of chamber wall 30. The rejuvenated fluid or coolant then flows via path 48 up over the top 50 of overflow wall 52 and then descends via path 54 and out through an opening 56 in right side panel 14 and through outlet pipe 58 to emerge as rejuvenated fluid or coolant. Optionally, one or more baffles or deflector plates can be provided in coalescing chamber 26 in order to force the fluid through more of the oil coalescing media in order to increase separation efficiency.

The oil or tramp oil in the oily water fluid tends to coalesce on the hydrophobic/oleophilic surfaces of the oil coalescing media or porous packing 32 and coalesces into larger droplets, which, due to their buoyancy, rise toward the top of the coalescing chamber 26. The tramp oil droplets rise to a level shown by dashed line 62 (the location of which is determined by the height of overflow wall 52) but can rise no higher due to the height and position of top 50 of overflow wall 52. As more tramp oil floats up and collects, the band of tramp oil, with its top surface always at or approximately at line 62, becomes thicker and thicker, gradually filling part or all of the space between line 62 and the top of packing 32 (it can even extend into the top of packing 32), resulting in a band of collected tramp oil which can be several inches thick. When enough tramp oil has collected beneath line 62, one or both of valves 66 and 68 are opened to permit the tramp oil to flow out through holes in front panel 12 and through the valves 66, 68 to be recycled or disposed of.

The portable separator 10 can be drained via drain valve 70 and lifted and carried via handle 72. To gain access to the porous packing 32 for cleaning, replacement or servicing, unscrew the thumbscrews 74, 76, and remove top 20 (with attached retainer 28 and plate 29 (see FIG. 1)).

Figure 8:
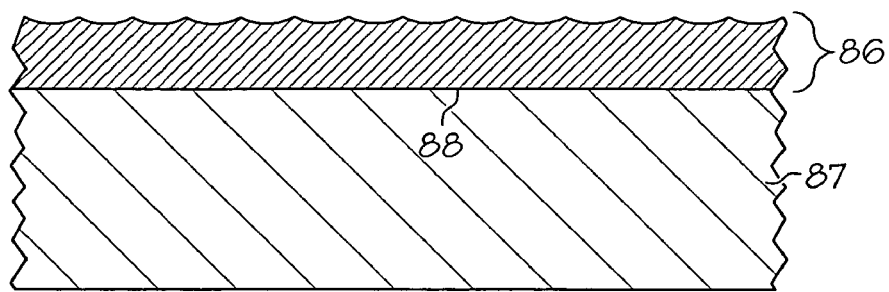
FIG. 8 is a schematic illustration of a band of collected oil floating on top of an aqueous fluid in the invented separator.

Valve 66 drains tramp oil through a hole in front panel 12, the location of which is shown at superimposed hole 82. The hole for valve 68 is shown at superimposed hole 84. Note that line 62 goes through the center of hole 82 and passes over the top of hole 84. FIG. 8 shows schematically a band 86 of collected or coalesced tramp oil floating on top of aqueous fluid 87 after coalesced oil droplets have floated up and coalesced. The band 86 has a bottom surface 88, which is the substantially planar interface between the oil and aqueous phases. Valve 66 and valve 68 should only be opened when the entirety of the corresponding hole 82 and 84 is completely covered by band 86 of tramp oil; otherwise, some of aqueous fluid (good coolant) 87 will be discharged. Each of valves 66 and 68 can be left open until surface 88 reaches the bottom of hole 82 or 84; then the corresponding valve should be closed to prevent some of aqueous fluid 87 from being discharged. Compared to hole 84, hole 82, since it is located higher, will permit more of the band of tramp oil to be drained off, but it will drain off more slowly than through hole 84. The locations of holes 82, 84 may be adjusted, so long as at least part of the hole extends below line 62.

Figure 7:
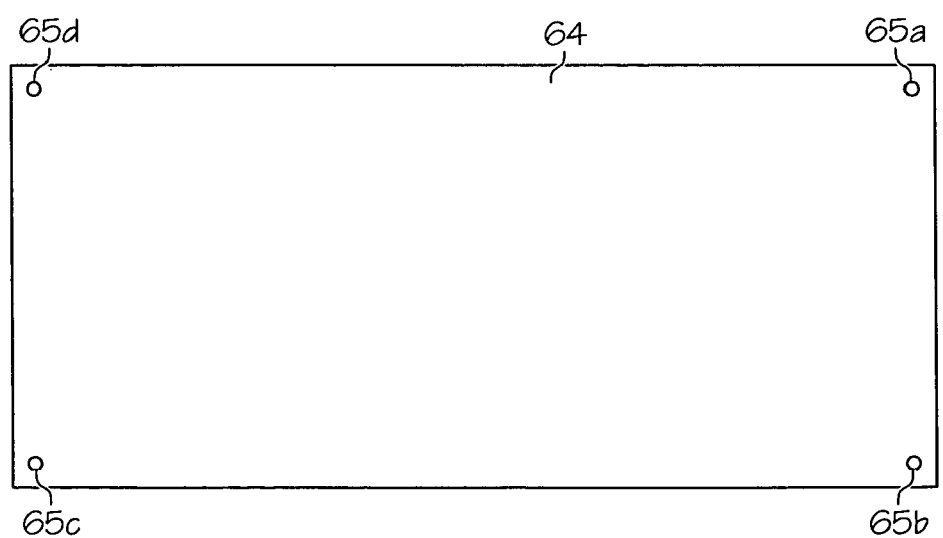
FIG. 7 is a plan view of a piece of felt with a magnet in each corner.
Figure 9:
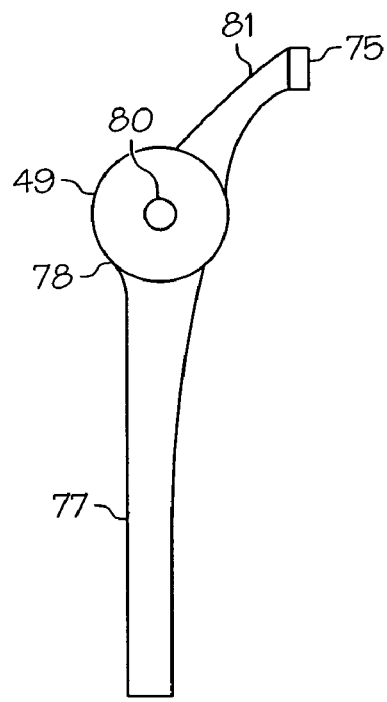
FIG. 9 is a right side elevational view of a cam release lever.
Figure 10:
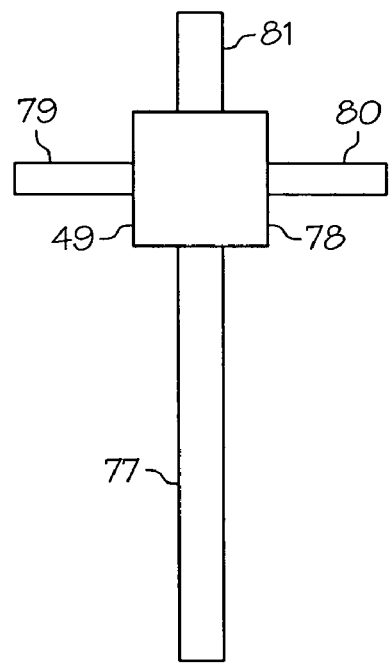
FIG. 10 is a back elevational view of the cam release lever of FIG. 9.

With reference to FIGS. 1, 2, 4 and 6, separator 10 has a back panel 18 on which is mounted a magnet base 42, which has four recesses each about ⅜" deep, each recess holding a round magnet 44a, 44b, 44c and 44d, such as a round base magnet, stock No. RB-80 from Adams Magnetic Products Co. Most of each magnet projects above the surface of magnet base 42 (projecting above the surface about ½"), but some is below the surface in the recess, to help hold the magnet in place. Each magnet is preferably covered by a rubber magnet boot or cap 45 (see FIG. 1) to prevent the magnet from scratching machinery or surfaces that the magnet contacts. Alternatively, a round cover of cloth or felt the same diameter as the magnet can be adhesively attached to the surface of the magnet to protect machinery from scratches, or as shown in FIG. 7, a piece of felt 64 about 20"×15" with small magnets 65a, 65b, 65c and 65d attached such as via adhesive to each corner; this piece of felt 64 is magnetically attached to the machine or steel surface and the magnets of the separator are placed over the felt so the machine is protected from scratches. The magnets on the magnet base are strong enough to permit the separator with prefilter to be held securely during normal operation or use off the floor or ground on a vertical steel surface, such as a steel machine housing. Being able to hang the separator on machines via magnets frees up valuable floor space, hangs the separator at or near eye level for ergonomic optimization and removing tramp oil without bending over, and makes cleaning the floor easier. (Alternatively, instead of the magnets, hooks, flanges, fasteners, straps or other attachment mechanisms as known in the art can be added to the separator to attach it to or hang it from a machine or other structure at its place of use.) To help pry the separator 10 off a machine that it is magnetically attached to, at locations 46 and 47 (see FIG. 6) there is mounted a prying releaser such as a cam release lever 49, such as shown in FIGS. 1, 2, 9 and 10. In FIGS. 9 and 10, cam release lever 49 has a lever arm 77, a hub 78, a pair of arms 79, 80 forming an axis about which the lever 49 rotates, and a cam arm 81 having a rubber tip 75. In use, lever cam 77 in FIG. 9 is pushed or rotated to the left, forcing cam arm 81 to move or rotate to the right so that tip 75 pushes against the steel surface or machine and helps pry the magnets free from the steel.

Figure 11:
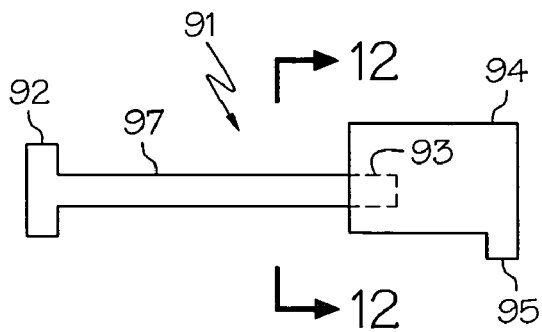
FIG. 11 is a side elevational view of a long nosed latch.
Figure 12:
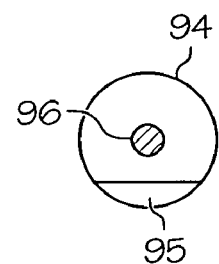
FIG. 12 is cross-sectional view taken along line 12-12 of FIG. 11.

With reference to FIG. 1, the front portion of separator 10 can be attached to magnet base 42 via a pair of long bolts terminated with nuts or knobs (not shown) which extend from front panel 12 (see bolt holes 89a and 89b in panel 12 in FIG. 3) through each of cross hanger supports 60, 61, through back panel 18 and through the corresponding holes 90a and 90b in magnet base 42 (see FIG. 1). More preferably, the front portion of separator 10 is removably attached or latched to magnet base 42 via a pair of long-nosed latches, as illustrated in FIGS. 11 and 12. With reference to FIGS. 11 and 12, there is shown a long-nosed latch 91 having a bolt portion 97 (having a bolt head 92 and a threaded end 93) threadingly attached to a latching head 94 via a female threaded opening 96 in head 94. Head 94 has an extending or depending lip 95. A pair of latches 91 are extended through cross hanger supports 60, 61 with the bolt head 92 engaging front panel 12. Head 94 is about 1 in. in diameter and accordingly, corresponding holes slightly larger than 1 in. in diameter are provided in magnet base 42 at the locations identified by holes 90a, 90b. To attach each latch 91, extend bolt portion 97 through front panel 12, through the cross hanger support and through back panel 18; then screw latching head 94 onto threaded end 93. Once both latches 91 are in position opposite the holes at 90a and 90b, push heads 94 through the holes until the extending lip 95 extends beyond and drops down to catch on the far side of magnet base 42. The extending lips 95 will latch onto the back of magnet base 42 to hold separator 10 in place. To remove separator 10, simply lift up until the extending lips 95 disengage, then pull heads 94 back through the openings.

Separator 10 preferably has a height of 10-30, 12-20, 13-16, or about 14, inches, a length of 10-36, 13-28, 16-22, or about 18, inches, a depth or width of 2-10, 3-8, 3.5-6, 3.5-5, or about 4, inches and preferably holds about 1-20, 1-15, 1-10, 1.5-7, 1.7-5, 1.9-4, 2-3, 2.2-2.8, or about 2.5, gallons of fluid during normal operation and preferably holds less than 20, 15, 10, 7, 5, 4 or 3 gallons of fluid during normal operation.

Prefilter 24 receives contaminated coolant from a pump pumping from a sump; the pump can be such as Little Giant Model No. 3E-12N, having a flow rate of 500 gal/hr. (but more typically 300-400 gal/hr. due to the height of the separator above the pump. The pump forces fluid through the prefilter and into separator 10. The presence of the pump tends to create (when it is turned off) a negative pressure or sucking in the feed line into the prefilter and thus in the prefilter and thus in tube or passageway 41, which tends to suck contaminated fluid from the coalescing chamber 26 back into the prefilter 24. To prevent this, and also to otherwise prevent fluid in chamber 26 from flowing back into the prefilter, a check valve 51 can be provided as part of tube or channel 38. Alternatively or in addition, a check valve can be placed at the inlet to the prefilter 24 or at the bottom of tube or passageway 41.

Preferably as much of the separator 10 as possible is made of transparent (or less preferably translucent) materials, such as transparent abrasion resistant acrylic or other transparent plastic. Preferably front panel 12, right side panel 14, left side panel 16, back panel 18, top 20, bottom 22, magnet base 42, handle 72, retainer 28, plate 29, right chamber wall 30, overflow wall 52, elbow 40, passageway 41, and cross hanger supports 60, 61 are made of transparent plastic as described above, less preferably of translucent material or translucent plastic. As shown in the Figures, coalescing chamber 26 has a sidewall surrounding it consisting of front panel 12, a left side panel 16, a right chamber wall 30, and a back panel 18. Preferably this sidewall, and the other panels and parts of the separator are sufficiently transparent or translucent so that the location of the bottom surface of the band of tramp oil, and the thickness of the band, can be visually discerned (preferably at a glance) by an unaided eye of an ordinary observer standing 2, 3, 4, 5, 6, 7, 8, 10, 12, 15, 18 or 20 feet away in ordinary lighting conditions. Preferably the parts of the separator are of sufficient transparency or translucency effective to permit the separator to be used for its intended purpose and effective to permit an unaided eye of an ordinary observer standing 2, 3, 4, 5, 6, 7, 8, 10, 12, 15, 18 or 20 feet away in ordinary lighting conditions to visually discern (preferably at a glance) the location of the bottom surface of the band of tramp oil and the thickness of the band.

Figure 3:
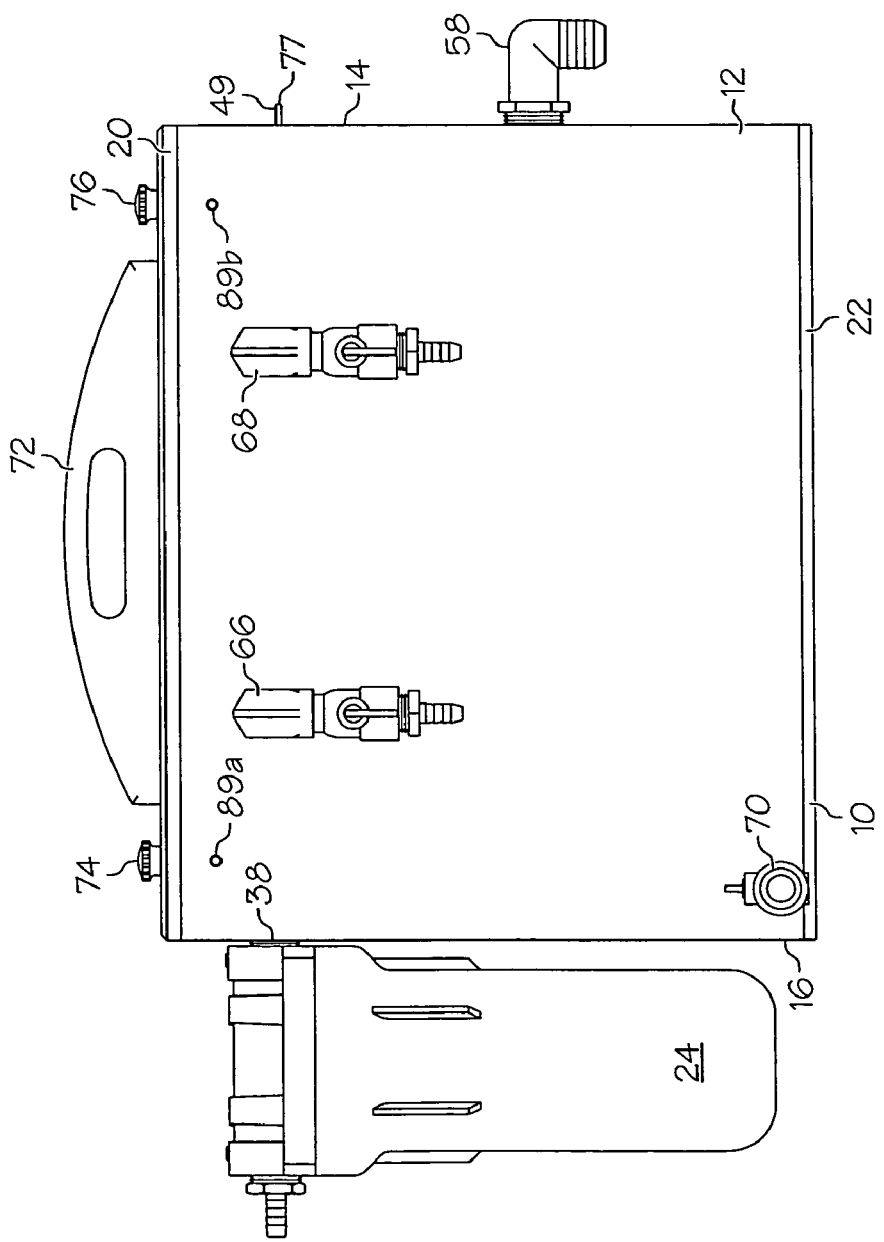
FIG. 3 is a front elevational view of the separator of FIG. 2 with the front panel 12 present.

As shown in FIG. 3, right side 14 faces 90° away from the direction front 12 faces.

Although the preferred embodiments have been described, various modifications may be resorted to without departing from the scope of the invention as disclosed and claimed herein.

What is claimed is:

1. An apparatus for separating oil from an oil water mixture, said apparatus comprising an oil water coalescing separator having a coalescing chamber having a sidewall, said coalescing chamber containing oil coalescing media, said separator containing during operation an aqueous fluid and a band of collected tramp oil having a thickness and floating on top of said aqueous fluid, said band having a bottom surface, at least a portion of said sidewall being sufficiently transparent or translucent so that the location of said bottom surface can be visually discerned through said portion by an unaided eye of an ordinary observer standing 8 feet away in ordinary lighting conditions, said separator being joined to two or more magnets effective to hold said separator during normal operation off a floor on a vertical steel surface, said separator having a back panel, said two or magnets being mounted outside said aqueous fluid and spaced apart on a backside surface of a magnet base, said magnet base being located adjacent to but distinct from said back panel, said separator being removably mounted to said magnet base by a plurality of spaced apart bolts, each said bolt including a bolt head and a latch head lip at opposite ends thereof and extending through corresponding holes in said panels and said magnet base that said bolt head engages said front panel and said latch head lip engages said backside surface of said magnet base.

2. The apparatus of claim 1, said separator having a front, said separator being such that an ordinary observer standing 8 feet away in ordinary lighting conditions can visually discern with an unaided eye at least half of the portion of said bottom surface which abuts said front.

3. The apparatus of claim 2, said separator having a side facing 90° away from the direction said front faces, said separator being such that an ordinary observer standing 8 feet away in ordinary lighting conditions can visually discern with an unaided eye at least half of the portion of said bottom surface which abuts said side.

4. The apparatus of claim 1, said separator having a front, at least half of the top half of said front being transparent or translucent.

5. The apparatus of claim 1, said separator having a front and a side, at least half of said front and at least half of said side being transparent.

6. The apparatus of claim 1, said separator having a front, a right side, a left side, and a back, each of said front, said right side, said left side, and said back being transparent.

7. The apparatus of claim 1, said magnet base being releasably joined to said separator such that said separator may be released from said magnet base without moving said magnet base from its location during normal operation.

8. The apparatus of claim 1, said separator having a handle for portability, said separator holding less than 5 gallons of fluid during normal operation.

9. The apparatus of claim 1, said oil coalescing media being porous packing.

10. The apparatus of claim 9, said porous packing having a specific surface area of at least 70 ft$^2$ per ft$^3$.

11. The apparatus of claim 1, further comprising a prying releasor effective to release said magnet base from a vertical steel surface.

12. The apparatus of claim 1, said magnet base having a front which is adjacent said back panel and a back which is spaced apart from said back panel.

13. The apparatus of claim 1, said separator having a valve which has an open position and a closed position, said valve, when opened, permitting said collected tramp oil to flow out of said separator.

14. The apparatus of claim 1, wherein said magnet base is planar.

15. The apparatus of claim 1, wherein said magnet base and said back panel abut each other.

* * * * *